US012076756B2

(12) United States Patent
Pereira-Santo

(10) Patent No.: US 12,076,756 B2
(45) Date of Patent: Sep. 3, 2024

(54) MULTI-TASK DEVICE COMPRISING MEANS FOR DISCHARGING A RIVET OR TEMPORARY FASTENER IDENTIFIED AS NON-COMPLIANT TO A DISPOSAL ZONE

(71) Applicants: SETI-TEC, Collegien (FR); Kawasaki Heavy Industries, Ltd., Hyogo (JP)

(72) Inventor: Sebastien Pereira-Santo, Charneca da Caparica (PT)

(73) Assignees: SETI-TEC, Collegien (FR); KAWASAKI HEAVY INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/063,376

(22) Filed: Dec. 8, 2022

(65) Prior Publication Data

US 2023/0182175 A1 Jun. 15, 2023

(30) Foreign Application Priority Data

Dec. 9, 2021 (FR) ....................................... 2113243

(51) Int. Cl.
*B07C 5/342* (2006.01)
*B07C 5/36* (2006.01)

(52) U.S. Cl.
CPC .............. *B07C 5/3422* (2013.01); *B07C 5/36* (2013.01); *B07C 2501/0009* (2013.01)

(58) Field of Classification Search
CPC . B07C 5/35; B07C 5/3422; B07C 2501/0009; B21J 15/28
See application file for complete search history.

(56) References Cited

U.S. PATENT DOCUMENTS 5,727,300 A * 3/1998 Ekdahl ..................... B21J 15/28 29/702
11,338,355 B2 5/2022 Ficken et al.
(Continued)

FOREIGN PATENT DOCUMENTS

DE 3917310 A1 11/1990
DE 20215 364 U1 11/2002
(Continued)

OTHER PUBLICATIONS

English translation of French Written Opinion dated Jul. 27, 2022 for corresponding French Application No. 2113243, filed Dec. 9, 2021.

(Continued)

*Primary Examiner* — Jacob S. Scott
*Assistant Examiner* — Miraj T. Patel
(74) *Attorney, Agent, or Firm* — David D. Brush; Westman, Champlin & Koehler, P.A.

(57) ABSTRACT

A multi-task device includes at least: a rivet support module able to contain a rivet and/or a temporary fastener support module able to contain a temporary fastener; a device for introducing a rivet or temporary fastener into the modules at at least one loading station; and a device for moving the at least one module to a work station for setting a rivet or temporary fastener in a hole provided in a structure to be worked on. The multi-task device includes a device for checking compliance of the rivet or temporary fastener depending on at least one predetermined compliance criterion, and a device for discharging, to a disposal zone, a rivet or temporary fastener identified as non-compliant by the device for checking.

21 Claims, 14 Drawing Sheets

(56) References Cited

U.S. PATENT DOCUMENTS

| | | | | |
|---|---|---|---|---|
| 2007/0079491 | A1 | 4/2007 | Hader | |
| 2017/0056960 | A1 | 3/2017 | Ficken et al. | |
| 2021/0095708 | A1* | 4/2021 | Dumas | F16B 19/008 |
| 2021/0171181 | A1* | 6/2021 | Hirai | B25B 11/005 |
| 2021/0346939 | A1* | 11/2021 | Tian | B21J 15/26 |

FOREIGN PATENT DOCUMENTS

| | | | |
|---|---|---|---|
| EP | 1772199 | A1 | 4/2007 |
| FR | 2809034 | B1 | 11/2002 |
| WO | 96/24450 | A1 | 8/1996 |
| WO | 03049899 | A2 | 6/2003 |
| WO | 2015/169727 | A1 | 11/2015 |
| WO | 2022008039 | A1 | 1/2022 |
| WO | 2022008040 | A1 | 1/2022 |
| WO | 2022008041 | A1 | 1/2022 |
| WO | 2022008042 | A1 | 1/2022 |
| WO | 2022008043 | A1 | 1/2022 |

OTHER PUBLICATIONS

French Search Report and Written Opinion dated Jul. 27, 2022 for corresponding French Application No. 2113243, filed Dec. 9, 2021.

* cited by examiner

[Fig 1]
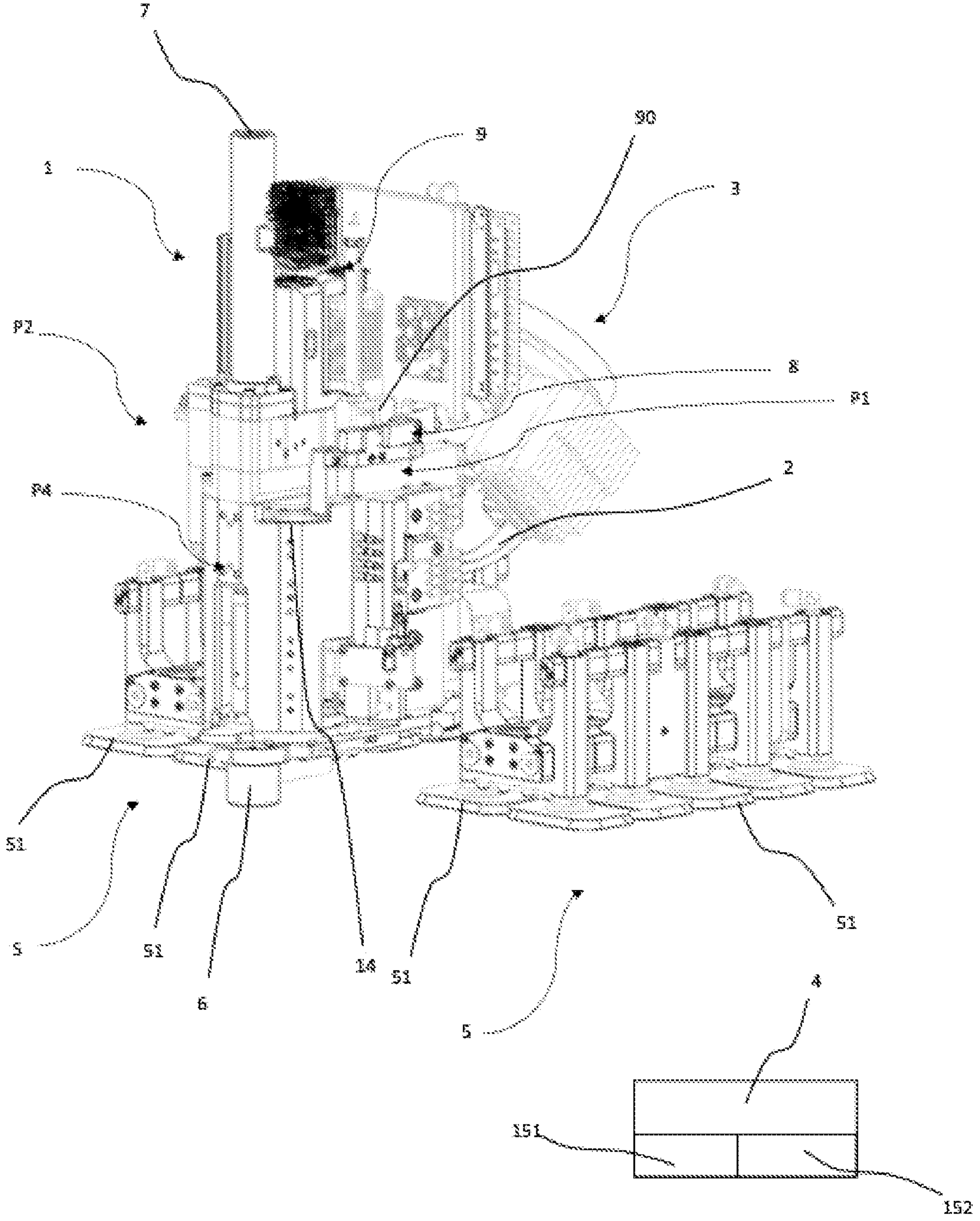

[Fig 2]
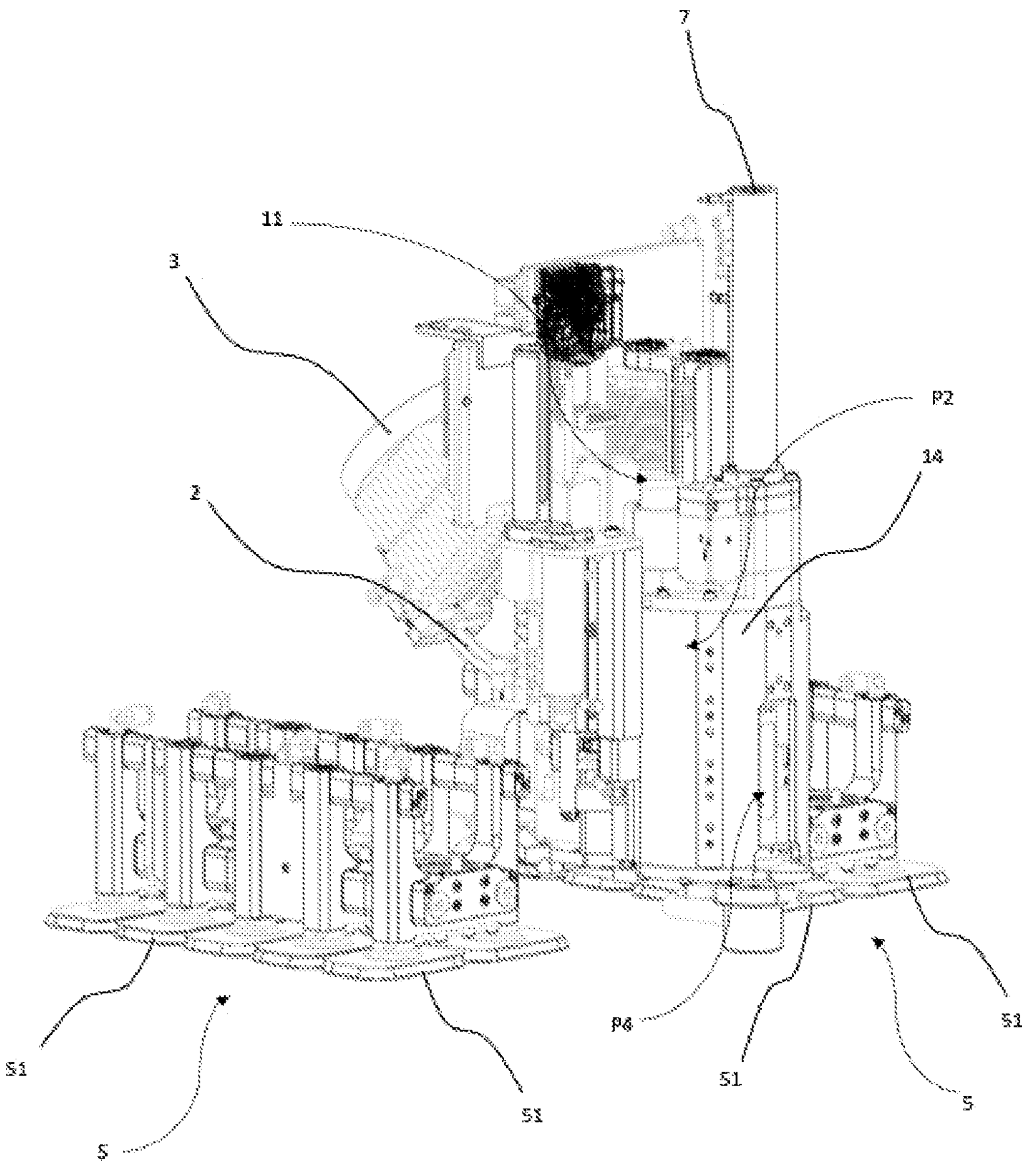

[Fig 3]
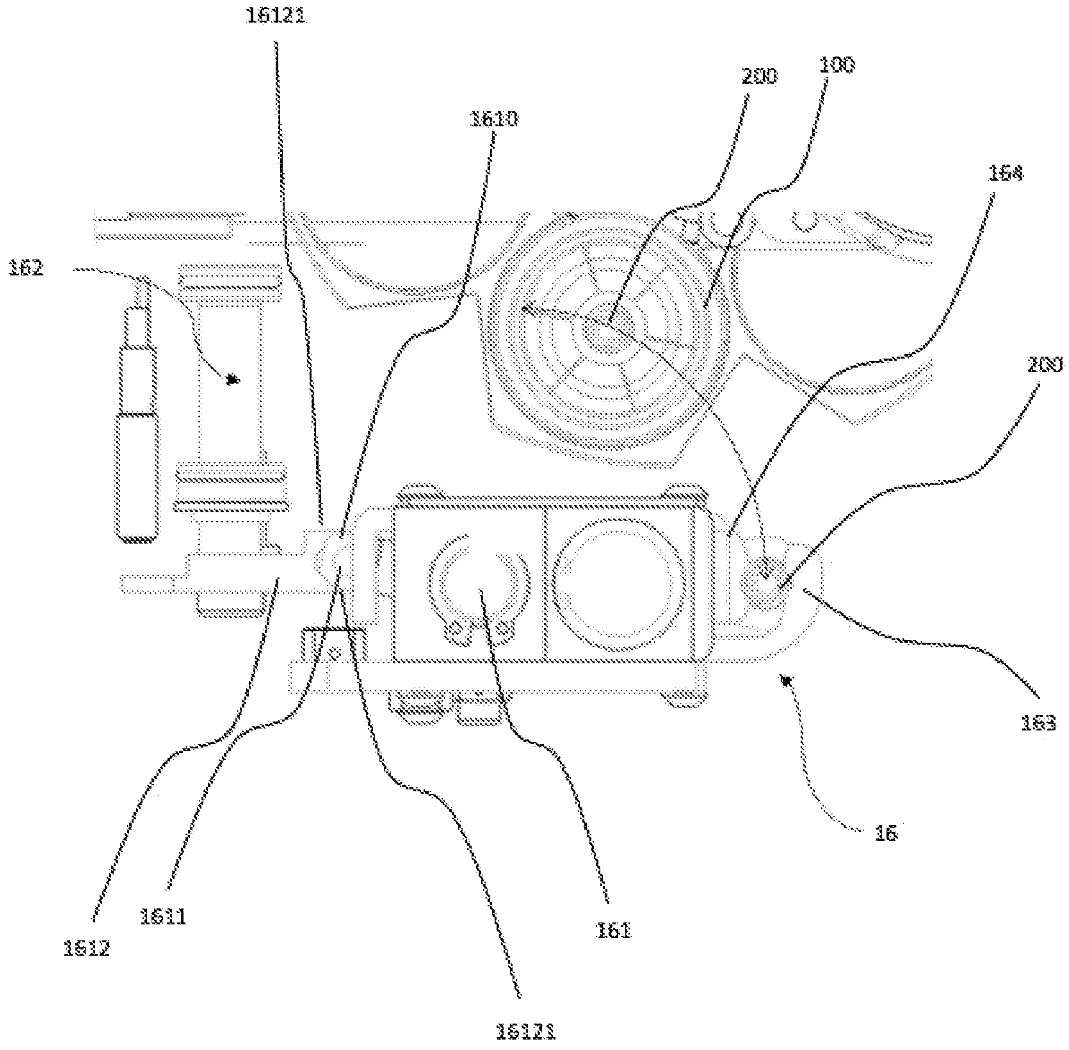
Suivant A

[Fig 4]
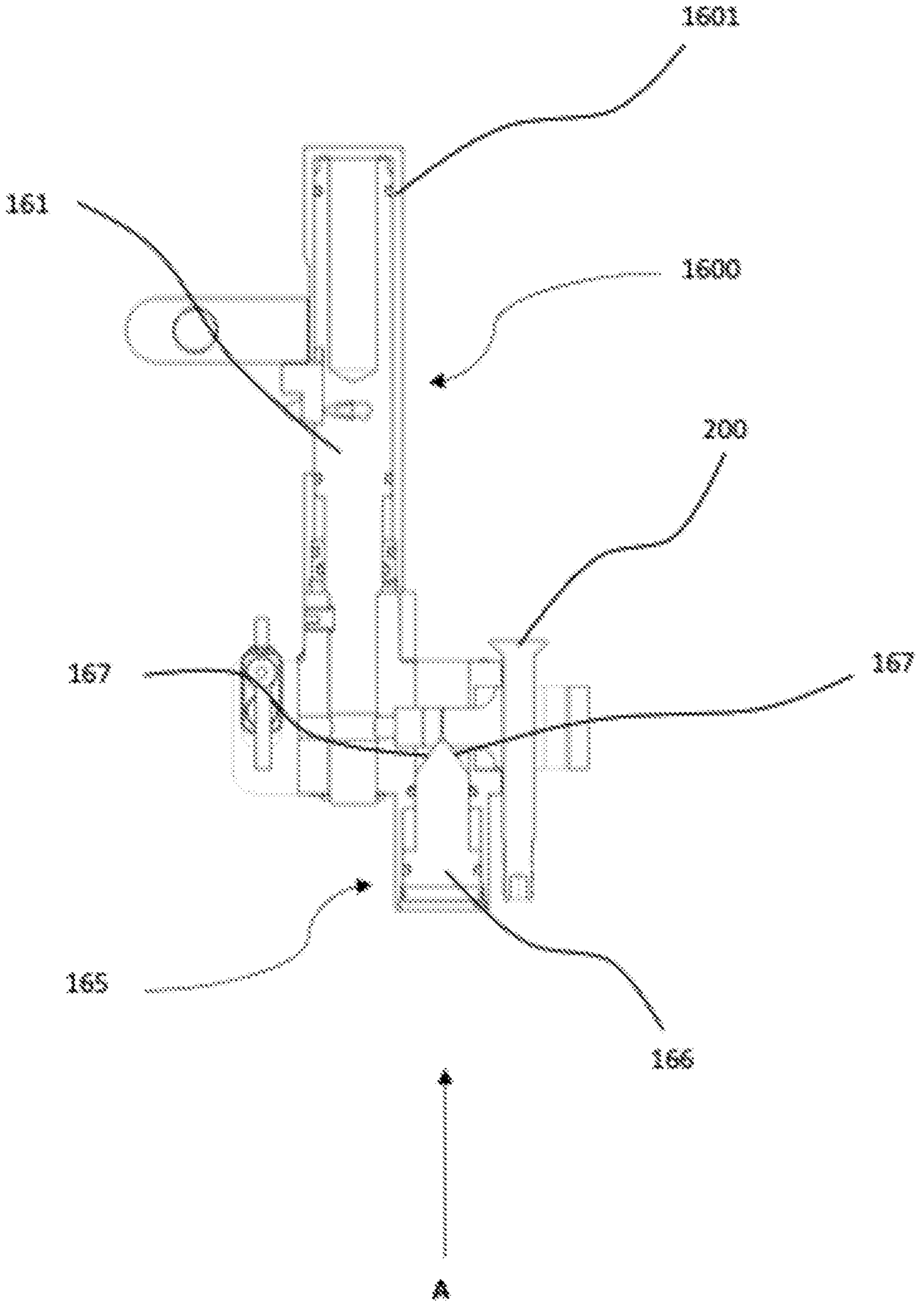

[Fig 5]
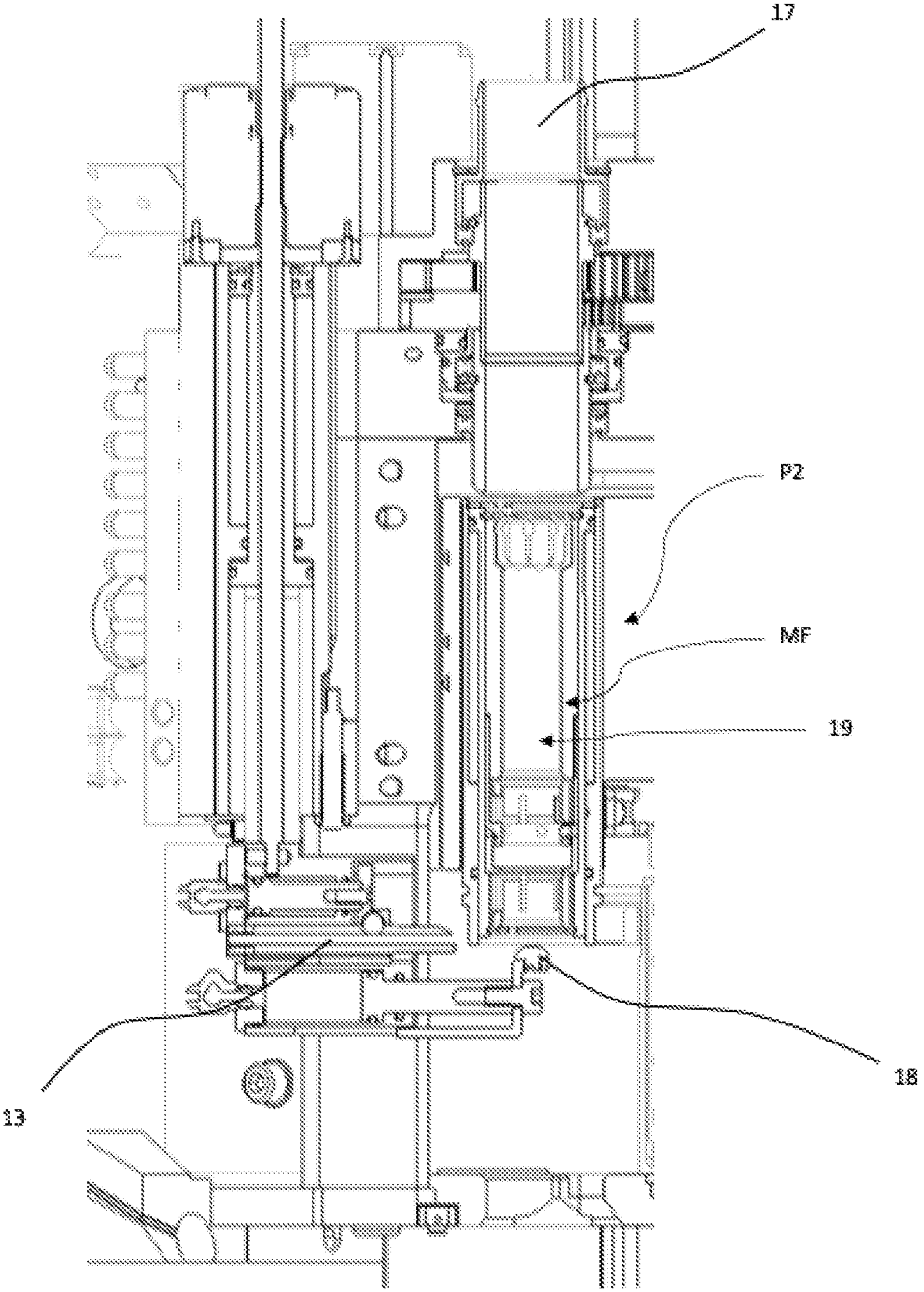

[Fig 6]
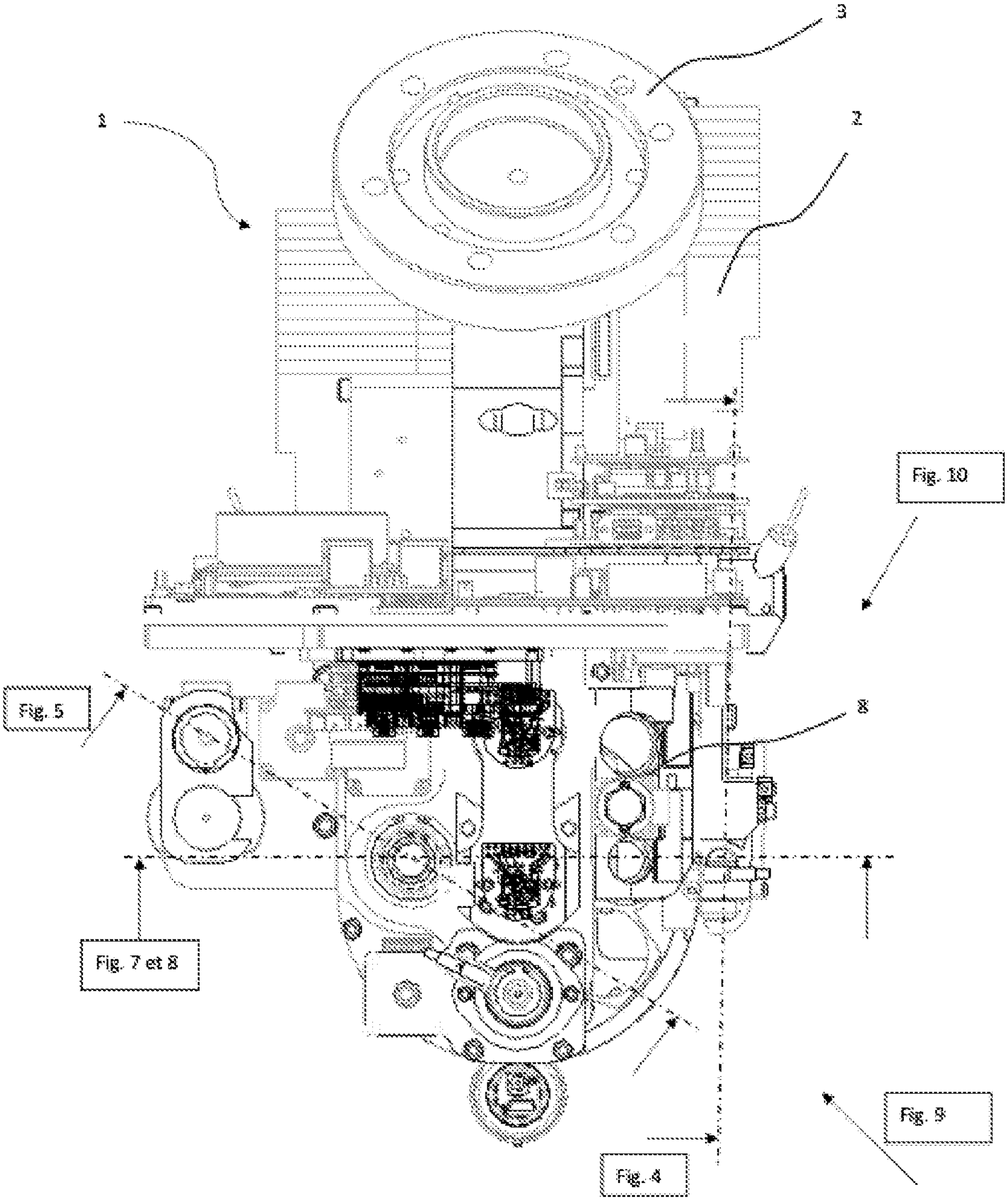

[Fig 7]
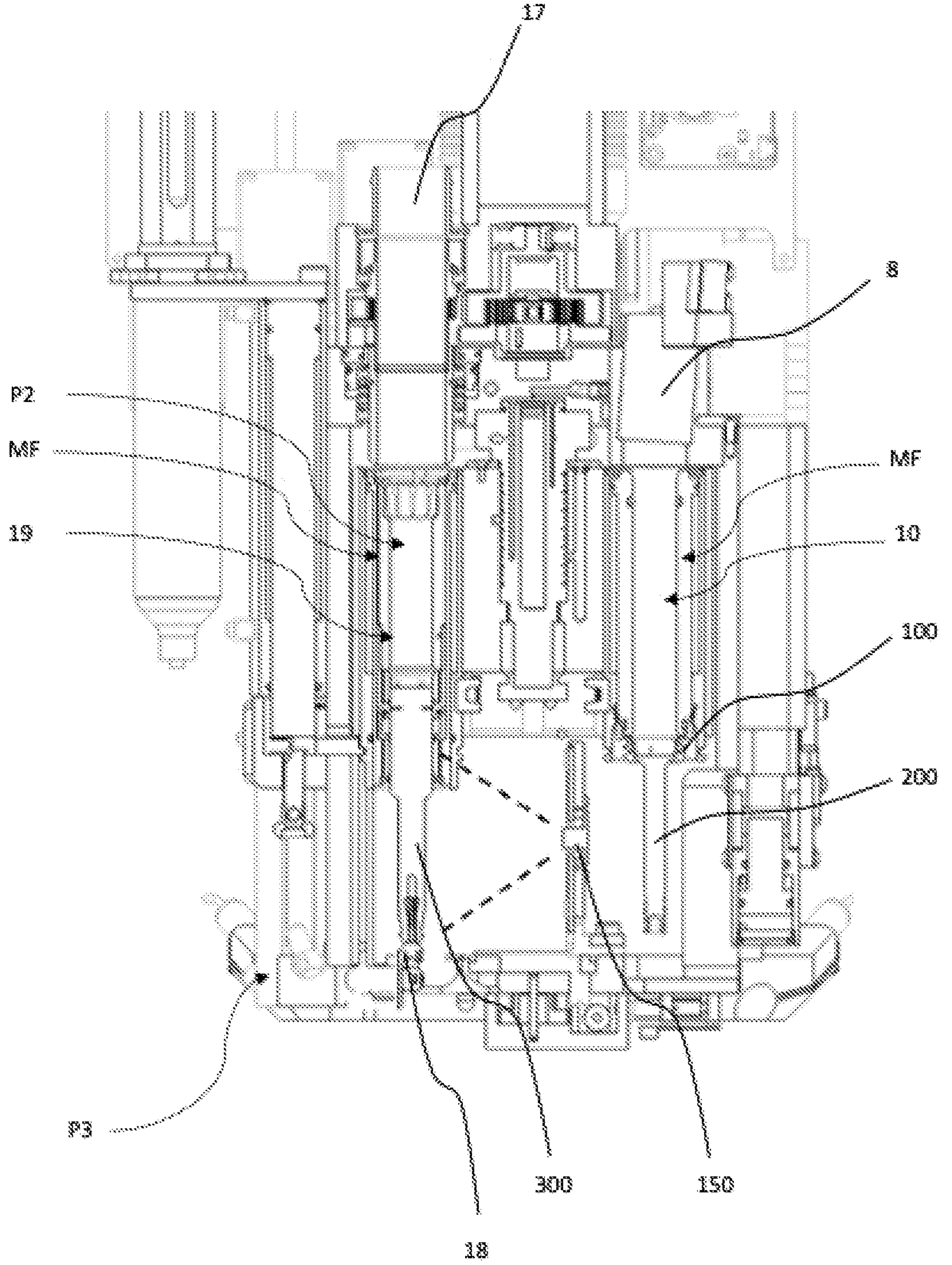

[Fig 8]
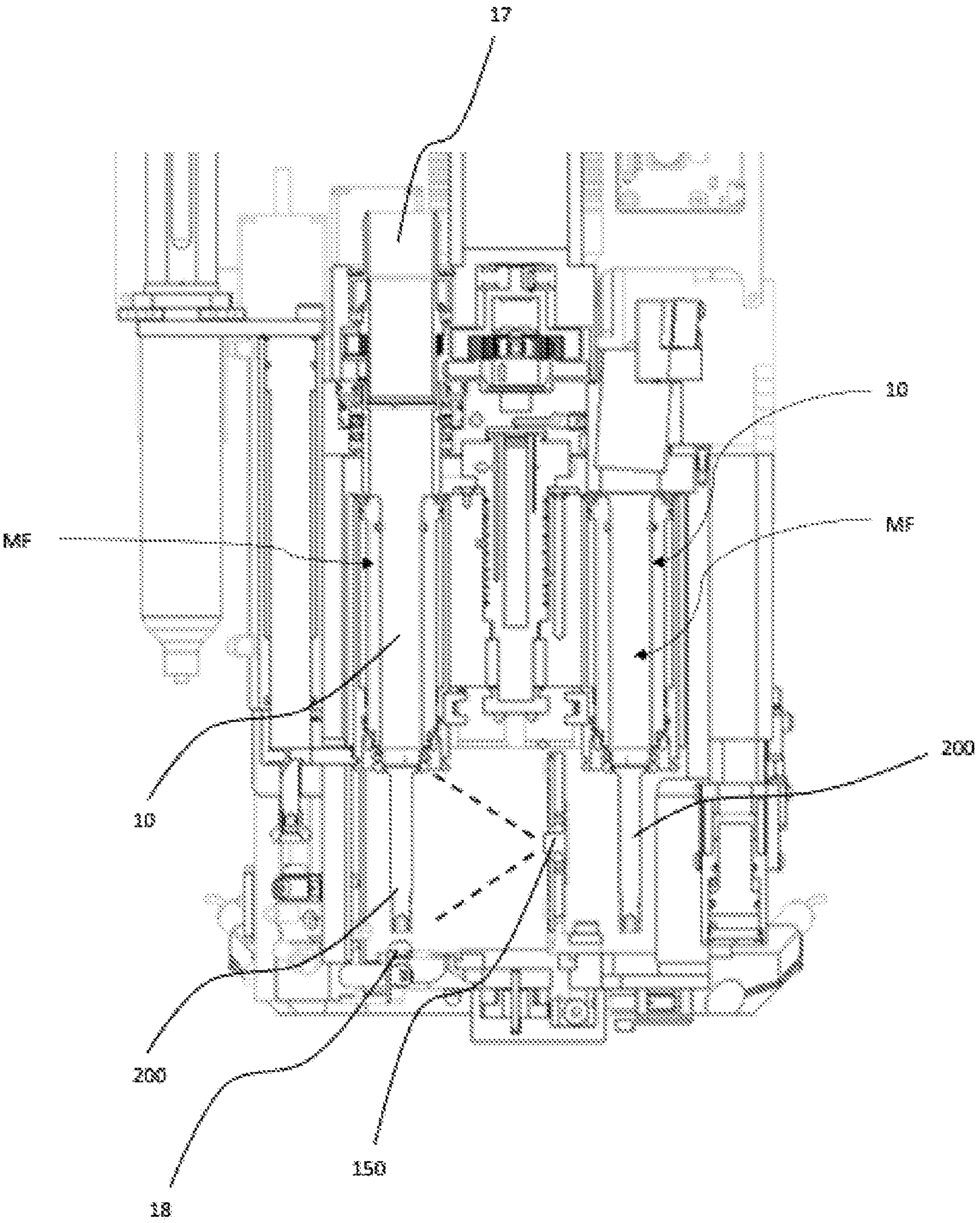

[Fig 9]
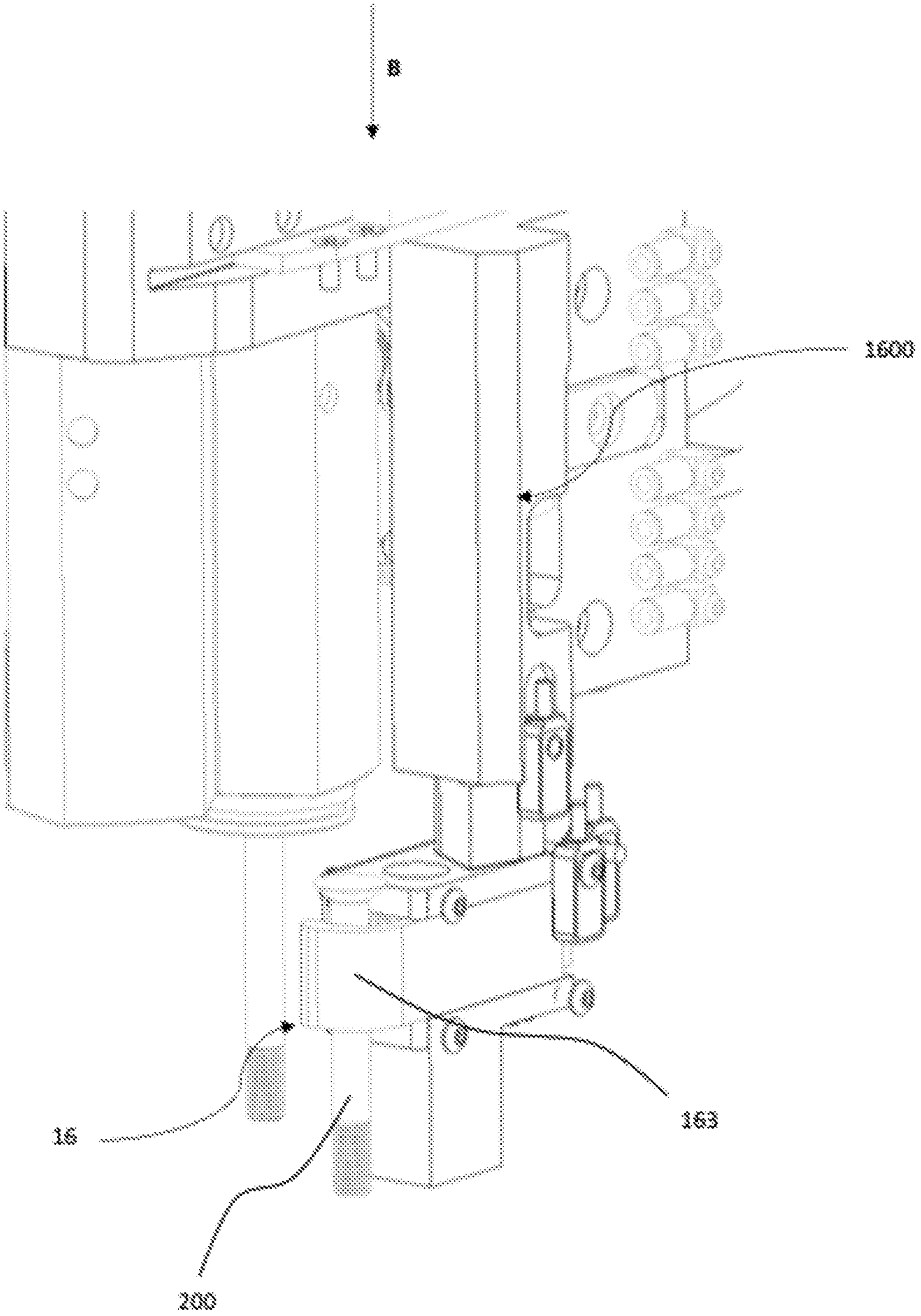

[Fig 10]
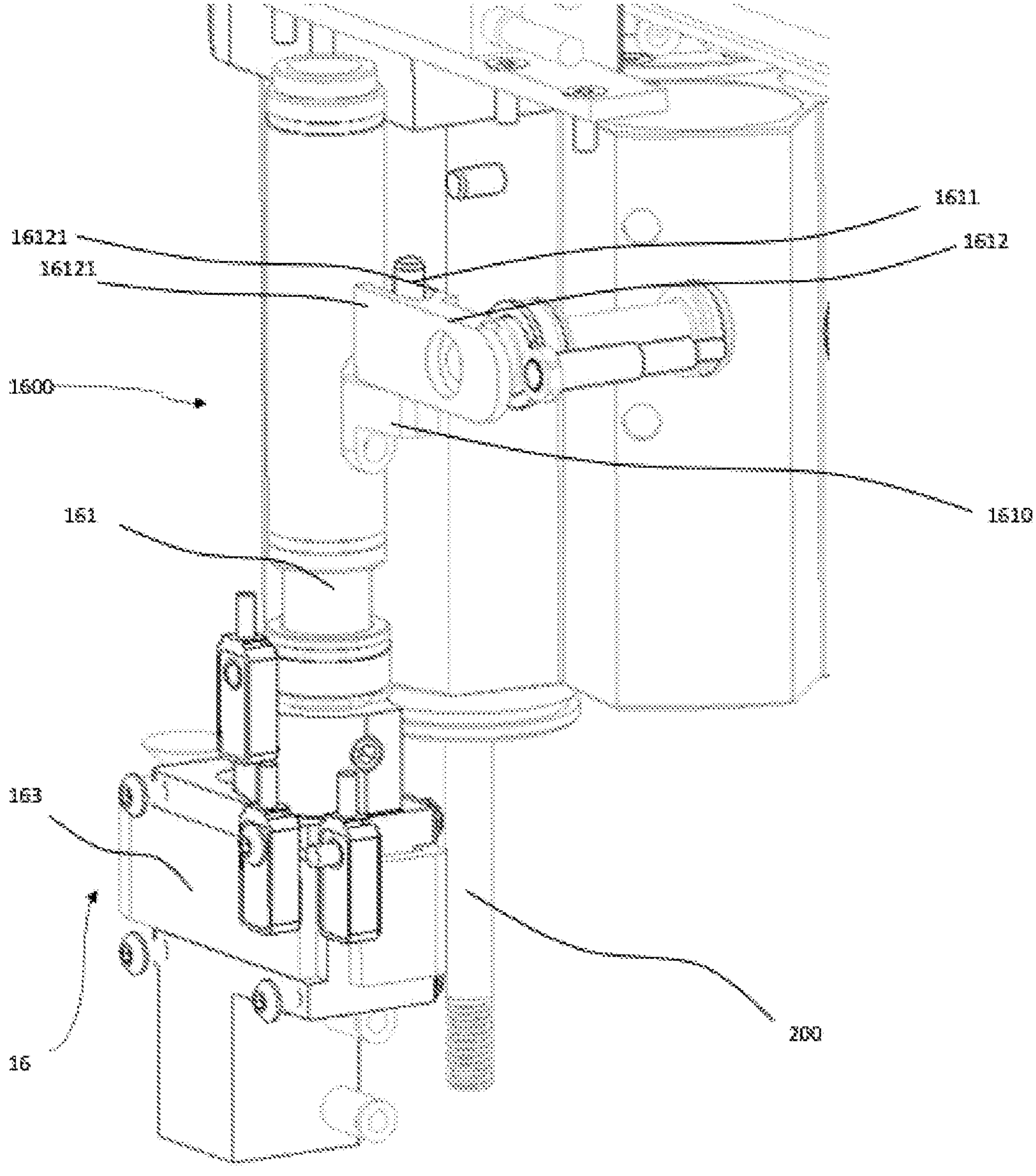

[Fig 11]
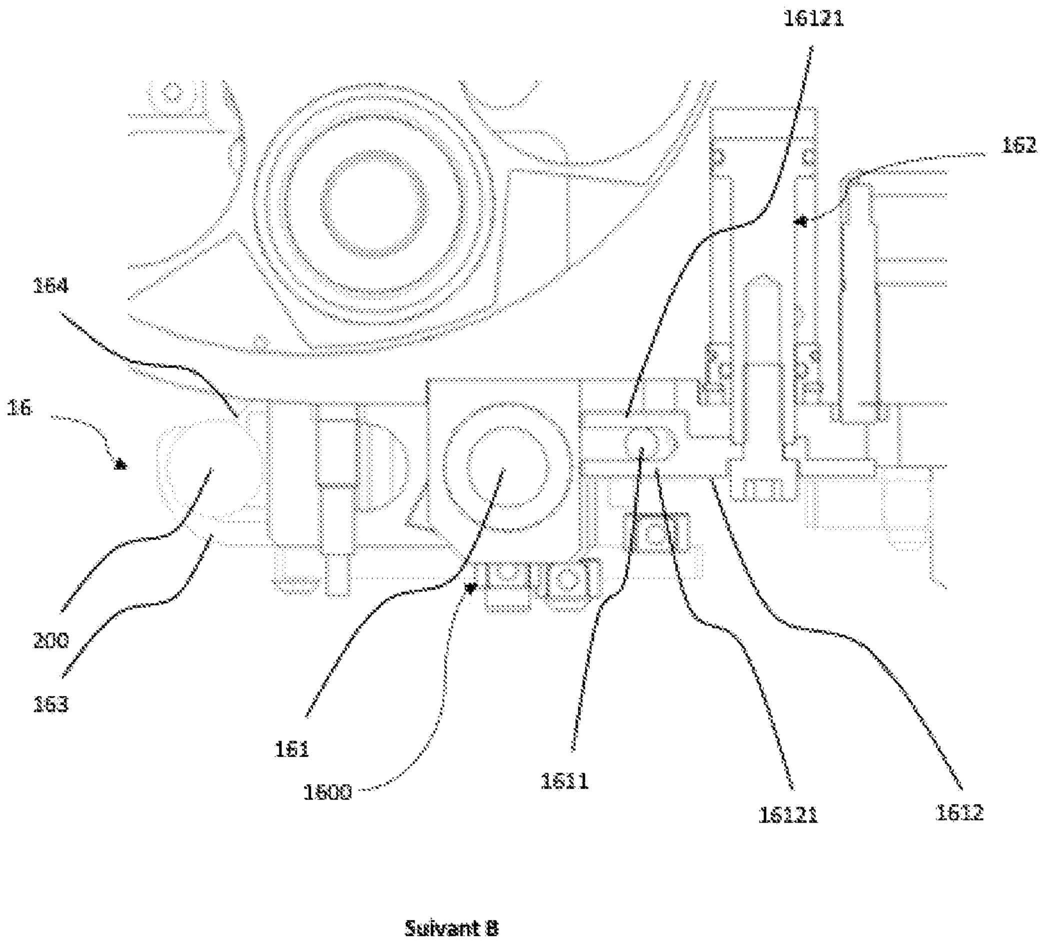

[Fig 12]
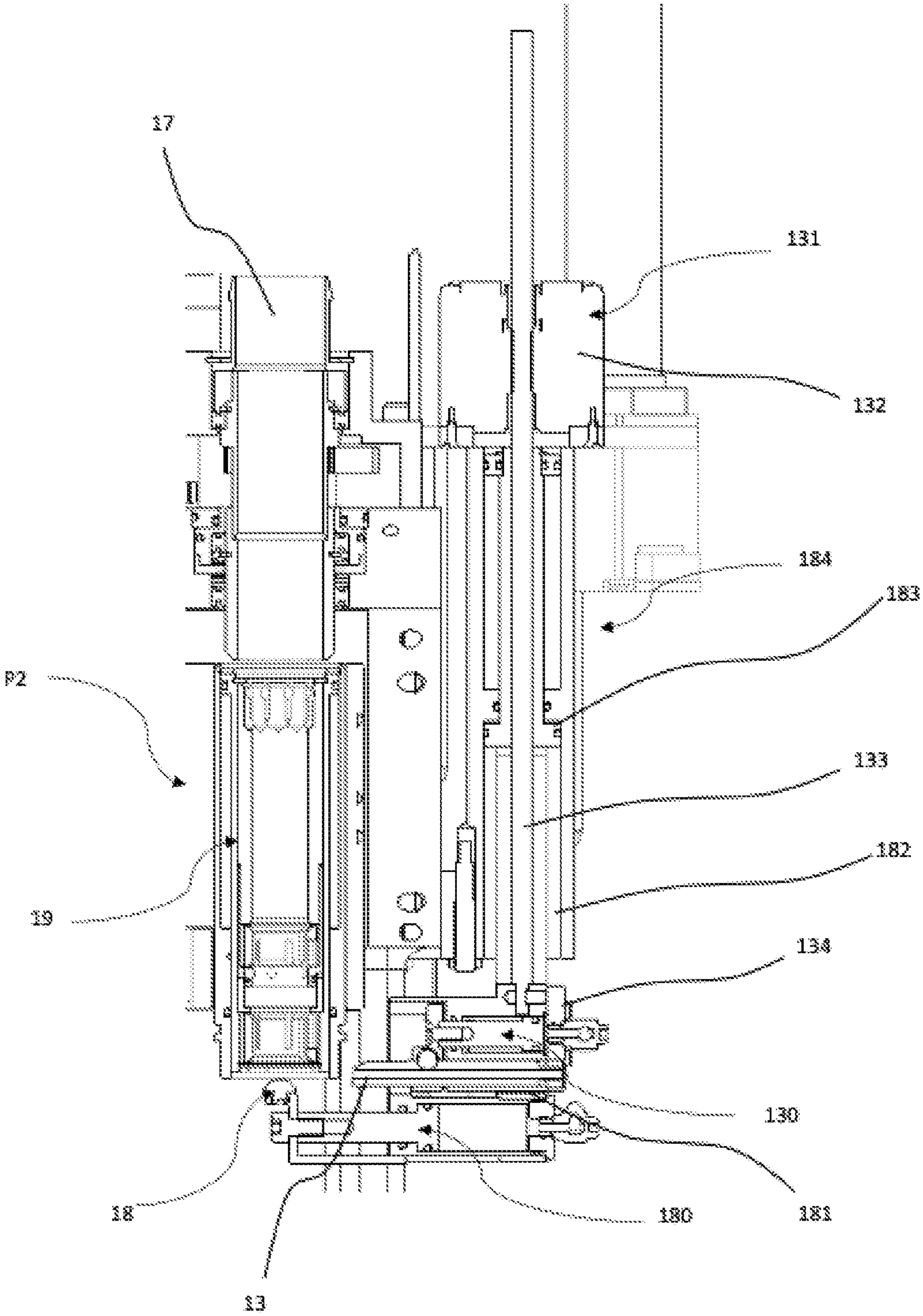

[Fig 13]
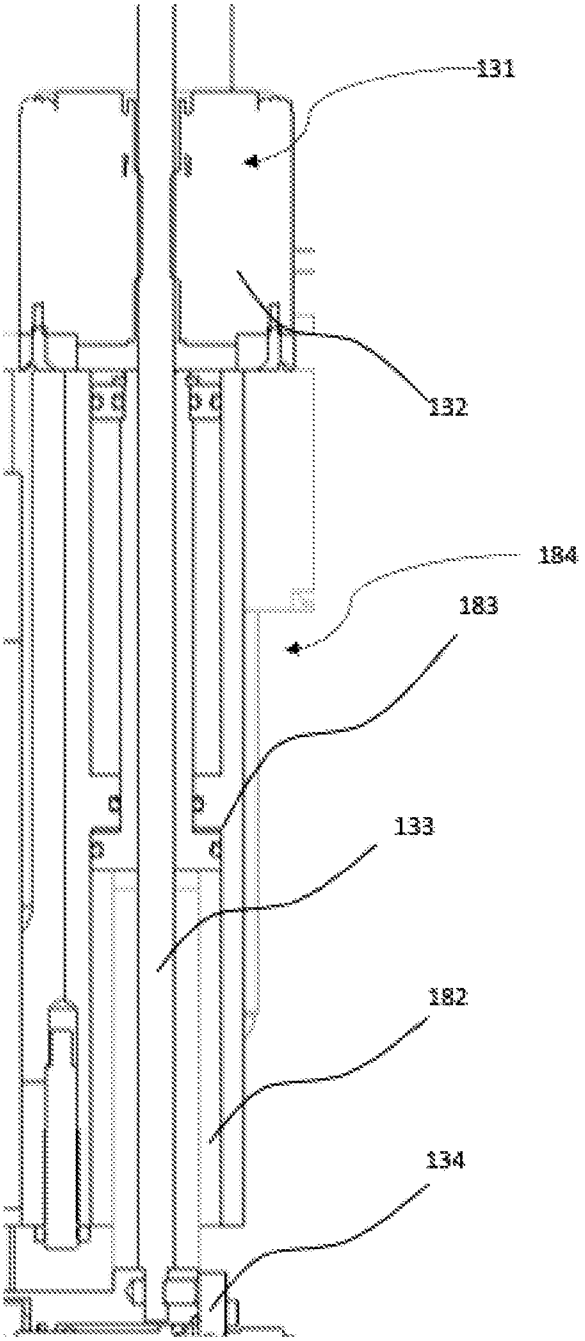

[Fig 14]
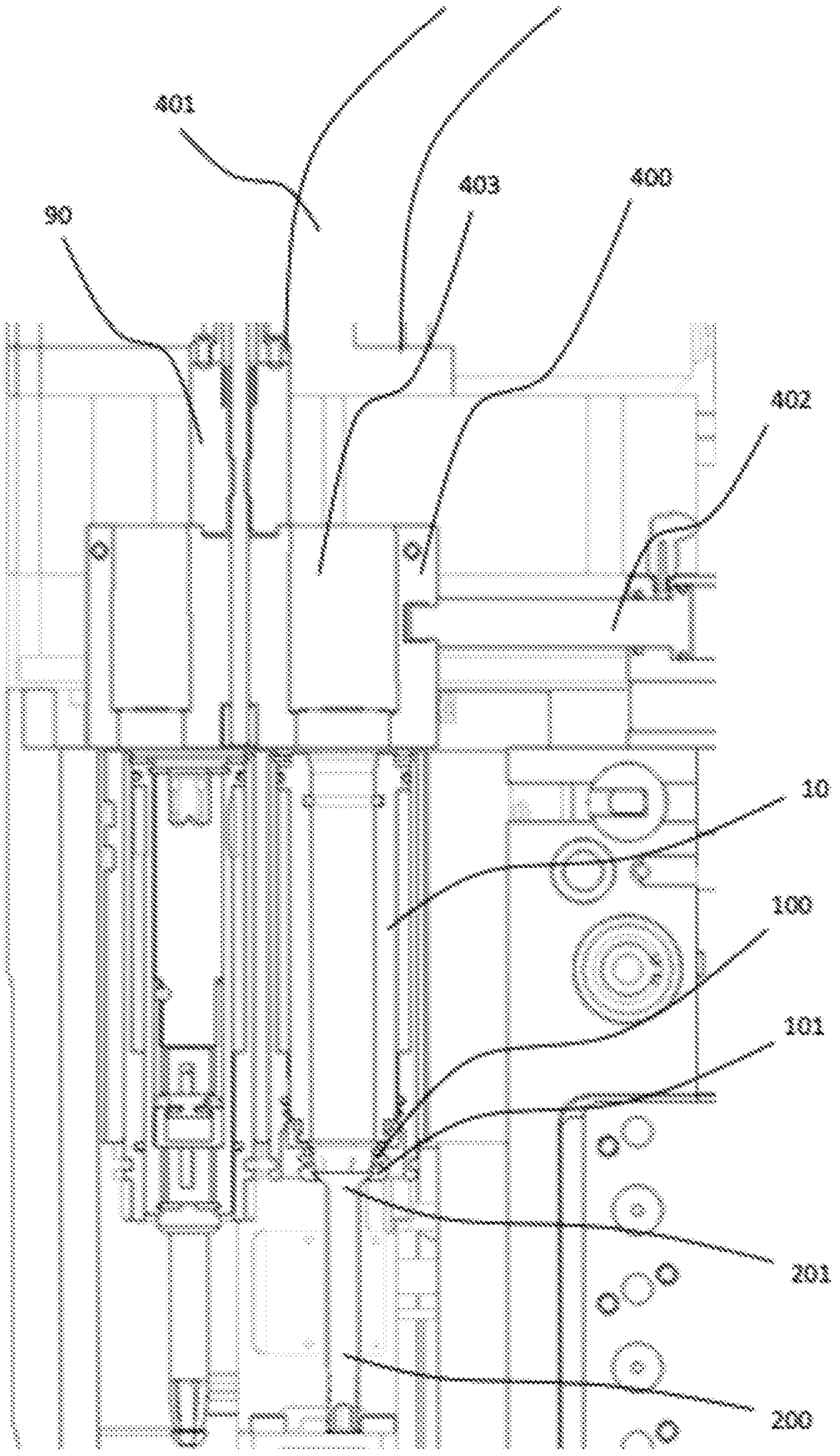

MULTI-TASK DEVICE COMPRISING MEANS FOR DISCHARGING A RIVET OR TEMPORARY FASTENER IDENTIFIED AS NON-COMPLIANT TO A DISPOSAL ZONE

1. FIELD OF THE INVENTION

The field of the invention is that of the design and production of devices used in industry to perform various tasks on a structure to be worked on, in particular for the aeronautical industry.

2. PRIOR ART

Many devices are commonly implemented to perform various tasks or operations on a structure to be worked on. Examples include drilling, milling, setting a temporary fastener, coating a rivet with sealant and then setting the rivet in a hole drilled in a structure or any other operation.

Mobile devices have been developed to perform tasks on complex structures as for example aeroplanes.

These devices include especially those of the type comprising tooling placed at the end of a robot arm to be manipulated and moved relative to the structure to be worked on, the device comprising securing means, such as suction cups, enabling the tool to be made integral with the structure to be worked on in order to transmit thereto forces due to the accomplishment of the task in order to relieve the robot arm.

Some devices of this type, known as multi-task devices, are likely to incorporate several functional modules, each dedicated to the performance of one particular task.

Such a device comprises a single outlet spindle likely to be rotationally and/or translationally driven along a single axis via motor and control means.

This single spindle can be caused to cooperate alternately with the various incorporated modules so as to enable the performance of a task to which they are dedicated.

Patent applications PCT/EP2020/069158, PCT/EP2020/069159, PCT/EP2020/069160, PCT/EP2020/069161, PCT/EP2020/069162, filed by the Applicant, describe multi-task devices.

The invention more particularly relates to multi-task devices for setting rivets, whether or not coated with sealant, and/or for setting temporary fasteners.

Rivet setting devices generally comprise a rivet loading station for loading rivets to be set into a rivet support module one by one. They optionally comprise a coating station at which the rivet support module incorporating a rivet to be set is moved to apply a sealant to the rivet. They also include a work station, located in line with the spindle, where the spindle acts on the rivet setting module to place it into the structure to be worked on.

Temporary fastener setting devices typically comprise a temporary fastener loading station for loading the temporary fasteners to be placed into a temporary fastener setting module one by one. They also comprise a work station, located in line with the spindle, where the spindle acts on the temporary fastener setting module to place the temporary fastener into the structure to be worked on.

It may happen, although rarely, that the rivet introduced into the rivet support module or the fastener introduced into the temporary fastener support module in order to perform a rivet or temporary fastener setting operation does not match the type of rivet or temporary fastener required to perform the desired operation. It may also be that the coating of a rivet before being set is not suitable.

In these cases, the setting task is not feasible.

There is therefore a need for enhancing the quality of these devices to prevent the possibility of non-compliant tasks being carried out.

3. SUMMARY

For this, the invention provides a multi-task device comprising at least:

- a rivet support module able to contain a rivet and/or a temporary fastener support module able to contain a temporary fastener;
- means for introducing a rivet or temporary fastener into said modules at at least one loading station;
- means for moving said at least one module to a work station for setting rivet or temporary fastener in a hole provided in a structure to be worked on.

According to the invention, said device comprises means for checking compliance of said rivet or said temporary fastener depending on at least one predetermined compliance criterion, and means for discharging to a disposal zone a rivet or temporary fastener identified as not compliant by said means for checking.

Thus, according to this aspect of the invention, the invention relies on the implementation of a technique for ensuring that the rivet or temporary fastener loaded into the multi-task device for setting actually matches with the setting operation desired to be performed, and if not, for discharging the non-compliant rivet or temporary fastener to a disposal zone.

According to one possible characteristic, said means for checking compliance are able to analyse the visual aspect of said rivet or temporary fastener and to deduce its compliance or non-compliance with respect to a visual reference aspect.

They may allow, when a device according to the invention is implemented to carry out a method for performing a task, for the performance of a compliance checking step to analyse visual appearance of said rivet or temporary fastener and to deduce its compliance or non-compliance with respect to a reference visual appearance.

According to one possible characteristic, said means for checking compliance comprise at least one camera and means for controlling said camera and analysing images captured by said camera, said control and analysis means being able to compare rivet or temporary fastener images captured by said camera, with reference images and to deduce therefrom the compliance/non-compliance of a rivet or temporary fastener.

They may allow, when a device according to the invention is implemented to carry out a method for performing a task, the performance of a step of capturing images of rivet or temporary fastener by means of said camera, a step of comparing said images with reference images and a step of deducing the compliance/non-compliance of a rivet or temporary fastener.

According to one possible characteristic, said means for discharging a non-compliant rivet or temporary fastener comprise gravity discharge means.

They may allow, when a device according to the invention is implemented to carry out a method for performing a task, the performance of a step of gravitarily discharging a rivet or temporary fastener.

According to one possible characteristic, said means for discharging a non-compliant rivet comprises a clamp movable between at least a gripping position in which it is able to grip a non-compliant rivet integral with said rivet support module and a discharge position in which it is likely to release said non-compliant rivet towards a disposal zone, said clamp being able to assume, in each of its positions, a tightened state and a released state.

When a device according to the invention is implemented to carry out a method for performing a task, it may comprise a step of moving said clamp from one to the other of its positions so as to implement a gripping step during which it grips a rivet or a temporary fastener a non-compliant rivet or temporary fastener integral with said rivet or non-compliant fastener support module, and a discharge step in which it releases said non-compliant temporary rivet or fastener to a disposal zone, the method comprising steps of tightening and releasing the clamp.

According to one possible characteristic, said clamp is rotatably movable between its gripping and release positions along an axis substantially parallel to the axis of said module.

When a device according to the invention is implemented to carry out a method for performing a task, it may comprise a step of rotatably moving said clamp along an axis essentially parallel to the axis of said module.

According to one possible characteristic, said clamp is translationally movably mounted along the axis of said spindle between at least:

- a retracted position in which it extends in proximity to an outlet end of said rivet support module, and
- a disengagement position in which it is remote from said outlet end of said rivet support module.

This may allow a rivet held in a rivet support module by means of an elastic ring to be moved so as to disengage its head from that clamp.

When a device according to the invention is implemented to carry out a method for performing a task, it may comprise a step of translationally moving said clamp along an axis essentially parallel to the axis of said module between its retracted and disengagement positions.

According to one preferred characteristic, said means for discharging an uncoated rivet or a temporary fastener comprises suction discharge means.

When a device according to the invention is implemented to carry out a method for performing a task, it may comprise a step of discharging a non-compliant rivet or temporary fastener comprising suction discharge means.

According to one possible characteristic, said suction discharging means of a non-compliant uncoated rivet or a temporary fastener comprises a discharge manifold and means for generating vacuum in said manifold.

When a device according to the invention is implemented to carry out a method for performing a task, it may comprise a step of generating vacuum in said manifold.

According to one possible characteristic, said means for introducing temporary fastener into said module comprises said manifold.

According to one possible characteristic, a multi-task device according to the invention comprises means for initiating said suction discharge comprising a pusher element able to position itself beyond the end of said non-compliant rivet or fastener, opposite to the one placed on the side of said manifold, said pusher element being translationally movably mounted along the axis of said rivet or temporary fastener.

When a device according to the invention is implemented to carry out a method for performing a task, it may comprise a step of initiating said suction discharge comprising a step of positioning a pusher element beyond the end of said non-compliant rivet or fastener, opposite to the one placed on the side of said manifold, and a step of translationally moving along the axis of said rivet or temporary fastener towards said rivet or temporary fastener.

According to one possible characteristic, a multi-task device according to the invention comprises a coating station comprising means for applying sealant to said rivet, said sealant applying means comprising a coating nozzle.

When a device according to the invention is implemented to carry out a method for performing a task, it may comprise a step of applying sealant to said rivet by means of a coating nozzle.

According to one possible characteristic, said gravity discharge means are adapted to discharge a non-compliant coated rivet.

According to one possible characteristic, said suction discharge means are able to discharge a non-compliant uncoated rivet or a non-compliant temporary fastener.

According to one possible characteristic, said coating station comprises a feeler able to determine the length of a rivet integral with a support module placed at said coating station.

When a device according to the invention is implemented to carry out a method for performing a task, it may comprise a step of determining the length of a rivet integral with a support module placed at said coating station by means of a feeler.

According to one possible characteristic, said pusher element is said feeler.

According to one possible alternative, a multi-task device according to the invention constitutes a multi-task device comprising at least one rivet support module and one temporary fastener support module, said work station device comprising a single spindle likely to be translationally and/or in rotatably driven along a same axis, said device comprising means for feeding each of said rivet support and temporary fastener modules individually to said work station, said single spindle being likely to cooperate with a rivet support or temporary fastener module placed at said work station to allow setting of a rivet or temporary fastener.

When a device according to the invention is implemented to carry out a method for performing a task, it may comprise a step of translationally and/or rotatably driving said single spindle along a same axis, a step of feeding each of said rivet support and temporary fastener modules individually to said work station, a step of cooperating said single spindle with a rivet support or temporary fastener module placed at said work station to allow setting of a rivet or temporary fastener.

According to one possible characteristic, said coating station, said temporary fastener loading station and said non-compliant rivet or temporary fastener suction discharge means are located at the same station.

According to one possible characteristic, said rivet loading station and said non-compliant rivet or temporary fastener gravity discharge means are located at the same station.

According to one possible characteristic, a multi-task device according to the invention comprises:

- a frame;
- means for attaching said frame to motor handling means able to move said device at least partially in space with respect to a structure to be worked on;
- means for positioning and/or securing said device to said structure to be worked on.

The invention also covers a method for performing a task by means of a multi-task device according to any one of the above alternatives, said method comprising a step of checking compliance of said rivet or said temporary fastener depending on at least one predetermined compliance criterion, and a step of discharging to a disposal zone a rivet or a temporary fastener identified as non-compliant by said checking means.

4. DESCRIPTION OF THE FIGURES

Further characteristics and advantages of the invention will become apparent from the following description of particular embodiments, simply given by way of illustrative and non-limiting example, and the appended drawings, of which:

FIG. 1 illustrates a perspective view of an example of a multitask device according to the invention;

FIG. 2 illustrates another perspective view from a different angle of an example of a multitask device according to the invention;

FIG. 3 illustrates a partial cross-sectional view along a plane orthogonal to the spindle of the device of FIG. 1 at the rivet loading station;

FIG. 4 illustrates a partial cross-sectional view along a plane parallel to the spindle of the device of FIG. 3;

FIG. 5 illustrates a partial cross-sectional view along a plane parallel to the spindle of the device of FIG. 1 at the temporary fastener loading station;

FIG. 6 illustrates a top view of a device according to the invention in which different cross-sectional planes and angles of view are represented for use in further figures;

FIG. 7 illustrates a partial cross-sectional view along a plane parallel to the spindle of the device of FIG. 1 at the temporary fastener loading station, with a temporary fastener support module at the temporary fastener loading station;

FIG. 8 illustrates a partial cross-sectional view along a plane parallel to the spindle of the device of FIG. 1 at the temporary fastener loading station, with a rivet support module at the temporary fastener loading station;

FIG. 9 illustrates a detail perspective view of a clamp and its drive means;

FIG. 10 illustrates a detailed perspective view of a clamp and its drive means from another angle;

FIG. 11 illustrates a cross-sectional detail view of a clamp and its drive means from another angle;

FIG. 12 illustrates a cross-sectional view of the drive means moving a coating nozzle and pusher element;

FIG. 13 illustrates a detail view of FIG. 12;

FIG. 14 illustrates a detail view of the loading of a rivet into a rivet support module.

5. DESCRIPTION OF PARTICULAR EMBODIMENTS

5.1. Architecture

Means for Attaching to Handling Means

An example of a multi-task device according to the invention is described in connection with FIGS. 1 to 14.

As represented in these figures, such a multi-task device 1 comprises a frame 2.

This frame 2 is equipped with means for attaching 3 to a motor handling device (not represented) to which it is to be secured in such a way that it can be moved at least in part relative to a structure to be worked on (not represented).

These motor handling means belong to the group comprising especially:

robot arms;

walking robots, for example according to the principle described in patent document FR-B1-2 809 034;

digital grids, for example according to the principle described in patent document WOA-2-200349899.

Such fastening means 3 are known per se and are therefore not described. They may, for example, comprise a plate and bolt type system, quick securing means such as a clamp or cam system . . . .

The motor handling means are able to move the multitask device at least in part (especially when the controller is fixed) in space relative to the surface of the structure to be worked on between at least one approach position in which the device is close to the surface while being distant from it and a docking position in which the device is in contact with the surface, for example with a view to being secured thereto if securing means are used.

Single Outlet Spindle

The device comprises a single drive spindle 7 which is rotatably and/or translationally movable along a single axis.

The device also comprises motor means and a transmission for rotatably and/or translationally driving the spindle along its longitudinal axis. These motor means are known per se and are not described in more detail here.

Controller

The device typically comprises a controller 4 comprising control and power electronics for controlling and powering the device.

This controller 4 is preferably contained in a cabinet remote from the frame 2 and stored in a fixed location on site.

The controller 4, or at least some of its components, could nevertheless be incorporated to the frame 2.

Means for Securing to a Structure to be Worked on (Optional)

The device may optionally, but preferably, comprise means for securing 5 to the structure to be worked on.

These securing means can be of different types.

For example, they may comprise suction cups 51 integral with the frame 2 and able to be connected to vacuum means, such as a vacuum pump, in order to improve securement to the surface of the structure to be worked on. These suction cups can be assembled in groups to form suction pads.

When no means for securing to the structure to be worked on is used, the handling device may not only provide a means of positioning the frame relative to the structure to be worked on, but also a means for immobilising it in position relative to the structure to be worked on.

Pressing Element (Optional)

The device may optionally comprise a tubular-shaped presser element 6 translationally mounted with respect to the frame 2 along the axis of movement of the spindle 51 and in the extension thereof.

The presser element is a hollow tube to allow the spindle to pass therethrough.

Such a presser element 6 may, for example, be used during a drilling operation to exert a compressive force on the structure to be drilled, especially to ensure contact between plates of a stack and to avoid the formation of burrs between these plates during drilling.

Functional Modules

The device is likely to incorporate a plurality of functional modules FM.

Each of these functional modules FM enables a particular task to be carried out, such as, for example, a drilling and/or milling operation, a rivet setting operation, a temporary fastener setting operation (e.g. a staple), an operation for applying (or coating) a bead of sealant to a fastening element (a rivet or a screw). Other functions could be contemplated, such as screwing.

The functional modules belong for example to the group comprising at least:

drilling and/or milling modules;

rivet support modules, whether or not coated with sealant;

support modules for temporary fasteners.

A temporary fastener used in the aeronautical industry is a mechanical member for clamping at least two walls against each other in order to carry out production operations necessary for the final assembly of these walls, such as counter-drilling or fitting of screws or rivets.

By definition, these temporary fasteners are removed as the screws or rivets perform their function of assembling the walls.

Temporary fasteners are placed in holes made in the walls after the walls have been initially relatively positioned.

Temporary fasteners only require access to one side of one of the walls.

Such functional modules are especially described in patent documents PCT/EP2020/069158, PCT/EP2020/069159, PCT/EP2020/069160, PCT/EP2020/069161, PCT/EP2020/069162, filed by the applicant.

In the present embodiment, the device comprises a rivet support module and a temporary fastener support module. However, it could comprise a plurality of rivet support modules or a plurality of temporary fastener support modules or a plurality of either of these modules. For example, it could be modules such as those described in the documents mentioned above.

Functional Stations

The device comprises various functional stations. It comprises especially:

a rivet loading station P1 which comprises rivet supply means 8, such as a drawer or carousel, and means 9 for introducing rivets one by one into the rivet support module 10, herein comprising a push cylinder 90;

a temporary fastener loading station P2 which comprises temporary fastener supply means 11 and means for introducing temporary fasteners one by one into the temporary fastener support module 19 a coating station P3 for coating rivets with sealant comprising means for applying sealant to rivets, the sealant applying means comprising a coating nozzle 13 (in this embodiment, stations P2 and P3 are at the same place, they could however be at different places);

a work station P4 as an extension of the spindle.

The coating nozzle 13 is translationally movably mounted along an axis orthogonal to the axis of the rivet support module 10 by means of a cylinder 130. It is also translationally movably mounted along an axis parallel to the axis of the rivet support module 10 by means of a motor reducer 131 likely to rotatably drive a threaded ring 132 with which a threaded rod 133, rotatably fixed immobile and translationally free, cooperates, the end of which is connected to a support 134 carrying the cylinder 130. The motor reducer 131, the threaded ring 132, and the threaded rod 133 thus constitute an electric cylinder able to translationally drive the nozzle support relative to the piston 182 of a cylinder 180 used to movably drive a pusher element 18, as will be described in greater detail later. The body of the cylinder 180 is integral with the threaded rod 133. Movements of the nozzle and the pusher element are independent.

The device includes means for bringing the various incorporated modules into alignment with the spindle 7 to perform a task. Such means may for example comprise a carousel 14, a cartridge belt or the like.

Such functional stations and means for moving the functional modules are especially described in patent documents PCT/EP2020/069158, PCT/EP2020/069159, PCT/EP2020/069160, PCT/EP2020/069161, PCT/EP2020/069162, filed by the applicant.

Means for Checking Compliance of a Rivet or Temporary Fastener

The device comprises means for checking compliance of a rivet or temporary fastener in accordance with at least one predetermined compliance criterion.

The predetermined compliance criteria may be, for example:

the diameter or length of the rivet or temporary fastener;

the regularity of the sealant application, geometric compliance of the application turn or diameter of the thread.

The compliance checking means are able to analyse the visual aspect of a rivet incorporated by a rivet support module or of a temporary fastener incorporated by a temporary fastener support module, and to deduce the compliance or non-compliance of the rivet or temporary fastener with respect to a visual reference aspect.

In this embodiment, the means for controlling compliance comprise at least one camera 150 and means for controlling 151 the camera and analysing 152 images captured by the camera.

The means for controlling the camera and analysing images captured by the same are able to compare the rivet or temporary fastener images captured by said camera, compare them with reference images and deduce compliance/non-compliance of a rivet or temporary fastener therefrom.

When a rivet or temporary fastener setting operation is to be carried out, the controller 4 controls the supply of rivet or temporary fastener so that the rivet or temporary fastener introduced into the rivet support module or temporary fastener support module matches the type of rivet or temporary fastener desired to be placed. For a variety of reasons, it is possible, although rare, that the rivet or temporary fastener loaded into the rivet or temporary fastener support module may not in practice be the correct type. In this case, the analysis means detect that the image(s) of the rivet or temporary fastener captured by the camera are different from the reference images and classify the rivet or temporary fastener loaded into the corresponding module as non-compliant. In the case where the rivet is coated with sealant, the analysis means detect that the image(s) of the coated rivet captured by the camera are different from the reference images and classify the coated rivet loaded into the corresponding module as non-compliant.

In this embodiment, the camera is located at the temporary fastener loading station. However, it could be located elsewhere, especially at the rivet loading station or at another station such as a compliance check station.

Means for Discharging a Non-Compliant Rivet or Temporary Fastener

The device comprises means for discharging to a disposal zone a rivet or temporary fastener identified as non-compliant by the check means.

Rivet Discharge

In this embodiment, the means for discharging non-compliant rivets comprise gravity discharge means.

They comprise a clamp 16, also known as a discharge clamp. This clamp is mobile between at least:

a gripping position in which it is able to grip a non-compliant rivet integral with the rivet support module, and a discharge position in which it is likely to release the non-compliant rivet to a disposal zone (see FIG. 3).

The clamp 16 is rotatably movable between these positions along an axis essentially parallel to the axis of the module, that is the axis of the spindle 7.

A pneumatic cylinder is used to ensure rotation of the clamp 16 about an axis 161. For this, it drives a kinematic chain which includes the following components.

A cylinder 162 translationally connected to a fork 1612 comprising two parallel and distant wings 16121. A pin 1611 is located between these wings. This pin is carried by a support 1610 itself connected to the axis 161 of rotation of the clamp.

Thus, when the cylinder 162 is activated, it thereby translationally moves the fork 1612, which in turn pushes the pin 1611. This action on the pin causes the axis 161 to be rotated and thus the clamp to be rotated.

Thus the exit of the cylinder leads to the movement of the clamp into the gripping position and its retraction to the movement of the clamp into the discharge position.

The axis 161 is the piston of a cylinder 1600 which allows the translation movement of the gripper along an axis parallel to that of the spindle.

In this embodiment, the clamp is also translationally movable along the axis of the axis 161 between at least:

- a retracted position in which the piston 161 enters its chamber 1601, and
- a position of disengaging the head of a rivet held in a rivet support module by the elastic ring 100 thereof; this position is assumed after moving the rod of the cylinder 161 in a direction moving the clamp away from the end of the rivet support module, and over a sufficient stroke for the head of the rivet to come out of the elastic ring 100 of the rivet support module.

The clamp comprises two jaws 163, 164 likely to be moved towards or away from each other such that the clamp can assume, in each of its positions, at least:

- a tightened state in which the jaws are moved towards each other to hold a rivet sandwiched, and
- a relaxed state in which the jaws are moved away from each other to grip or release a rivet.

The two jaws are translationally movable relative to each other to switch from one to the other of their states along an axis orthogonal to the axis of a rivet sandwiched in the clamp.

A cylinder 165 makes it possible to act on the jaws to switch them from one to the other of their states. This cylinder comprises a piston 166 whose rod has at least one tilted ramp 167 along a plane orthogonal to a plane passing through the axis of translation of the jaws and tilted with respect to this axis. This ramp acts, when the rod of the cylinder is moved to leave the cylinder chamber, on one of the jaws so as to move it away from the other to open the clamp. When the cylinder rod is retracted, a reverse closing motion is generated and facilitated, if necessary, by a return spring.

In one preferred alternative, the end of the cylinder rod comprises two oppositely arranged tilted ramps. Each of these ramps acts on one of the jaws when the cylinder rod is moved.

The clamp can assume a resting state in which it is in the discharge position and a released state.

Discharge of Temporary Fasteners

In this embodiment, the means for discharging non-compliant temporary fasteners comprises suction discharge means.

More precisely, the suction discharge means for non-compliant temporary fasteners comprise a discharge manifold 17 and means for generating vacuum in the manifold such as a vacuum pump not represented.

This manifold 17 opens out at the temporary fastener loading station P2. It allows not only the discharge of non-compliant temporary fasteners, but also the supply of the loading station with temporary fasteners. It therefore also partly constitutes the means for supplying and introducing temporary fasteners into the temporary fastener support module.

This manifold is connected to a steering device (not shown), driven by the controller, which is itself connected to a number of storage zones each storing a different type of temporary fastener. The steering device is also connected to a disposal zone.

The device includes means for initiating suction discharge of non-compliant temporary fasteners.

These initiating means comprise a pusher element 18 able to be positioned beyond the end of the non-compliant fastener opposite to that placed on the side of the manifold. The pusher element 18 is translationally movably mounted along an axis orthogonal to the spindle 7 by means of a cylinder 180. The pusher element is translationally movably mounted along the axis of said rivet or said temporary fastener, that is along the axis of a functional module. For this, the cylinder 180 is integral with a support 181 attached to the end of the piston 182 translationally movable in the chamber 183 of a pneumatic cylinder 184.

The pusher element 18 can also perform a feeler function, the purpose of which is to define the starting position of the nozzle upon coating a rivet with sealant. Such a function is described in more detail in patent application PCT/EP2020/069160. In this embodiment, the pusher element has two functions. It not only initiates suction discharge. It also acts as a feeler at the coating station. In its feeler function, it is moved until it stops against the end of a rivet integral with a rivet support module placed at the coating station (herein the temporary fastener loading station) to determine the length of the rivet, to ensure the rotational guidance of the rivet and to allow its proper coating according to the principle described in patent applications PCT/EP2020/069158, PCT/EP2020/069159, PCT/EP2020/069160, PCT/EP2020/069161, PCT/EP2020/069162, filed by the Applicant.

Discharge Alternatives

In this embodiment, the gravity discharge means allow discharge of non-compliant rivets, whether coated or not, and the suction discharge means allow discharge of non-compliant temporary fasteners. In one preferential alternative, the suction discharge means allows discharge of non-compliant and uncoated rivets.

In alternatives, the gravity discharge means could allow discharge of non-compliant temporary fasteners.

Alternative Arrangements

In this embodiment, the coating station, the temporary fastener loading station and the suction discharge means are located at the same station. However, they could be arranged differently.

In this embodiment, the rivet loading station and the gravity discharge means are located at the same station. However, they could be arranged differently.

5.2. Operation

In order to perform a task on a structure to be worked on, the handling means are firstly used to move the multi-tasker to the place on the structure where the task is to be performed. Marking elements may be previously provided or arranged on the structure to be worked on to mark the place(s) where tasks are to be performed. These marking elements can be, for example, pre-existing holes.

These holes are made by skilled operators at the location of future rows of holes to be made by the end effector. Their number is in the order of one pre-existing hole for several dozen future holes.

Multiple checks by the operator ensure that these pre-existing holes are perfectly positioned.

They can thus be used as a reference for the positioning of the end effector or for setting temporary fasteners used to maintain the relative position of the parts that are to be assembled and therefore counter-drilled.

After the multi-task device is positioned at the place where a task is to be performed, it is placed in its approach position in which it extends some distance, for example in the order of a few centimetres, from the surface of the structure to be treated. The approach position is such that the axis of the spindle is normal to the surface of the structure and intersects the surface of the structure to be worked on at the place where it is desired to make a hole or set a temporary fastener or rivet.

However, inaccuracies in registering the motor handling means to the surface require checking with a possible position correction.

If the initial marking element is a pre-existing hole, the handling means start by centring the spindle of the multi-task device on this hole and then move the end effector relative to this hole to reach the location of the hole to be drilled, the relative positioning of these pre-existing and to-be-drilled holes being known to the control means of the handling means.

Means for checking orthogonality of the axis of the spindle with respect to the surface, such as for example a camera coupled to lasers projecting a pattern onto the surface of the structure, are implemented to verify whether or not the axis of the spindle is orthogonal to the surface. If not, the orientation of the device is changed by the handling means so as to correct tilt of the spindle axis to the surface.

Once the position of the device and orthogonality of the spindle are correct, the device is moved into its docking position by the handling means.

If necessary, the securing means, such as suction cups, are activated to secure the frame to the structure to be worked on.

After securing, the pressing element is moved towards the surface of the structure to be worked on, if necessary, in order to press it against the surface of the structure to be worked on.

When the device is suitably positioned and/or secured, the module corresponding to the operation desired to be carried out is placed in the axis of the spindle and paired thereto.

Rivet Setting Operation

Prior to performing a rivet setting operation, a hole is made in the structure to be worked on at the location where the rivet is to be set. This hole is chamfered.

To set a rivet 200, the controller controls movement of the rivet support module to the rivet loading station.

The operation of introducing a rivet into a rivet support module 10 involves the following steps:

- a spool 400, located upstream of the entrance to the rivet support module, is positioned by means of a cylinder 402 driven by the controller so that a flexible rivet feed tube 401 extends from the rivet support module 10;
- the controller then drives the supply and loading means to introduce the rivet desired to be set into the feed tube 401; this rivet to be set arrives in the rivet support module 10, through the inlet orifice 403 provided in the spool, with a some momentum under the effect of compressed air used to move it in its feed tube 401 and the rivet stops when it comes into contact with the face of the discharge clamp oriented to the outlet of the rivet support module, the clamp being previously placed by the controller in the gripping position, in the tightened state, and in the retracted position. The clamp 16, connected to its cylinder 1600 in the retracted position, absorbs the shock of the rivet as it arrives;
- then the clamp 16 is rotated into its discharge position by virtue of the action of the cylinder 162;
- the spool 400 is moved by means of the cylinder 402 so that the rivet pushing cylinder 90 extends from the rivet support module 10;
- the rod of the cylinder 90 enters the rivet support module 10 and pushes the rivet 200 so that the head 201 of the rivet 200 is engaged in the peripheral locking groove 101 of the elastic ring 100 of the module 10.

Once the rivet is in place in the rivet support module, the controller drives the clamp to return to its resting position, that is to a released state and to the discharge position.

If it is desired to coat the rivet with sealant, the controller drives movement of the rivet support module to the coating station and then drives the coating means to coat the rivet. Once the coating is complete, the controller controls the camera to take at least one view of the rivet so that the analysis means can verify whether or not the rivet is compliant.

If it is not desired to coat the rivet, the controller nevertheless drives movement of the rivet support module to the coating station. The controller controls the camera to take at least one view of the rivet so that the analysis means can verify whether the rivet is suitably coated or not.

If the coated or uncoated rivet is considered as non-compliant by the analysis means, the controller controls movement of the rivet support module to the rivet loading station. It actuates the clamp to bring it into its gripping position. It then controls switching of the clamp into its tightened state in which it sandwiches the rivet to be discharged. It then drives switching of the clamp into its disengagement position so as to unsecure the rivet from the elastic ring of the rivet support mould. Finally, it drives movement of the clamp into its discharge position in which it places the clamp in its released state to gravitarily discharge the non-compliant rivet to a disposal zone therefor or directly onto the floor.

If the coated or uncoated rivet is considered as compliant by the analysis means, the controller controls movement of the rivet support module at the work station. It actuates the spindle so that it is paired with the rivet support module and then moves it so that the rivet can be set.

Once the rivet has been set, the controller drives unpairing of the spindle and then movement of the rivet support module to a holding station or to the rivet loading station if it is desired to set another rivet.

Temporary Fastener Setting Operation

To set a temporary fastener 300, the controller controls movement of the temporary fastener support module to the temporary fastener loading station. The controller then drives the feeding and loading means to introduce the temporary fastener desired to be set into the temporary fastener support module. The feeler is then used to stop the temporary fastener at the correct height within the support module. The temporary fastener is then locked into the temporary fastener holder module with means therefor. Once the temporary fastener is in place in the temporary fastener support module, the controller controls the camera to take at least one view of the temporary fastener so that the analysis means can verify whether or not it is compliant.

If the temporary fastener is considered to be non-compliant, the controller controls suction activation in the manifold, and then the movement of the feeler towards the manifold, by means of the pneumatic cylinder 184, over a short distance to provide a pulse and facilitate suction of the temporary fastener. It concomitantly drives placing the manifold under vacuum so that the temporary fastener is sucked therein to be discharged. The controller also controls the steering device so that the non-compliant temporary fastener is conveyed to the desired zone, for example the disposal area or a storage area, so that the non-compliant temporary fastener can be used subsequently, in particular if the non-compliance is due to the wrong type of temporary fastener being introduced into the module but the temporary fastener has no other functional defects.

If the temporary fastener is considered as compliant by the analysis means, the controller controls movement of the temporary fastener support module to the work station. It actuates the spindle so that it is paired with the temporary fastener support module and then moves the spindle so that the temporary fastener can be set.

Once the temporary fastener has been set, the controller drives unpairing of the spindle, and then movement of the temporary fastener support module to a storage station or to the temporary fastener loading station if it is desired to set another temporary fastener.

Other tasks can then be carried out at the same place at another part of the structure to be worked on.

An exemplary aspect of the present disclosure provides an effective solution to at least some of the different problems of the prior art.

An exemplary aspect of the present disclosure provides a rivet and/or temporary fastener setting technique which helps to prevent the performance of non-compliant rivet or temporary fastener setting operations.

An exemplary aspect of the present disclosures provide such a technique which enables the rivet or temporary fastener loaded in the device to be checked before it is set.

An exemplary aspect of the present disclosure provides such a technique which enables the rivet or temporary fastener loaded into the device to be verified for suitability for the setting operation desired to be performed.

An exemplary aspect of the present disclosure provides such a technique which enables suitability of the coating of a rivet to be set to be verified before performing its setting.

An exemplary aspect of the present disclosure provides such a technique which is simple to implement and/or robust and/or versatile.

Although the present disclosure has been described with reference to one or more exemplary embodiments, workers skilled in the art will recognize that changes may be made in form and detail without departing from the disclosure and/or the appended claims.

The invention claimed is:

1. A multi-task device comprising at least:

a rivet support module able to contain a rivet and/or a temporary fastener support module able to contain a temporary fastener;

means for introducing a rivet or temporary fastener into said modules at at least one loading station;

means for moving said at least one module to a work station for setting a rivet or temporary fastener in a hole provided in a structure to be worked on;

means for checking compliance of said rivet incorporated by said rivet support module or temporary fastener incorporated by said temporary fastener support module depending on at least one predetermined compliance criterion; and means for discharging to a disposal zone a rivet or temporary fastener identified as non-compliant by said means for checking.

2. The multi-task device according to claim 1, wherein said means for checking compliance are configured to analyse visual appearance of said rivet or temporary fastener and to deduce its compliance or non-compliance with respect to a visual reference appearance.

3. The multi-task device according to claim 2, wherein said means for checking compliance comprise at least one camera and means for controlling said camera and analysing images captured by said camera, said control and analysis means being configured to compare the rivet or temporary fastener images captured by said camera, with reference images and deduce compliance/non-compliance of a rivet or temporary fastener therefrom.

4. The multi-task device according to claim 1, wherein said means for discharging a non-compliant rivet or temporary fastener comprises gravity discharge means.

5. The multi-task device according to claim 4, wherein said means for discharging a non-compliant rivet or a temporary fastener comprise a clamp movable between at least one gripping position in which the clamp is able to grip a non-compliant rivet or temporary fastener integral with said rivet or fastener support module and a discharge position in which the clamp is likely to release said non-compliant rivet or temporary fastener towards a disposal zone, said clamp being able to assume, in each of its positions, a tightened state and a released state.

6. The multi-task device according to claim 5, wherein said clamp is rotatably movable between its gripping and release positions along an axis essentially parallel to the axis of said module.

7. The multi-task device according to claim 5, wherein said clamp is translationally movably mounted along the axis of said spindle between at least:

a retracted position in which the clamp extends in proximity to an outlet end of said rivet support module, and a disengagement position in which the clamp is remote from said outlet end of said rivet support module.

8. The multi-task device according to claim 1, wherein said means for discharging a rivet or a temporary fastener comprise suction discharge means.

9. The multi-task device according to claim 8, wherein said suction discharge means comprise a discharge manifold and means for generating vacuum in said manifold.

10. The multi-task device according to claim 9, wherein said means for introducing a temporary fastener into said module comprise said manifold.

11. The multi-task device according to claim 8, further comprising means for initiating said suction discharge means, comprising a pusher element able to be positioned beyond an end of said non-compliant rivet or fastener, opposite to that placed on a side of said manifold, said pusher element being translationally movably mounted along an axis of said rivet or said temporary fastener.

12. The multi-task device according to claim 1, comprising a coating station comprising a coating nozzle for applying sealant to said rivet.

13. The multi-task device according to claim 4, wherein said gravity discharge means are configured to discharge a non-compliant coated rivet.

14. The multi-task device according to claim 8, wherein said suction discharge means are configured to discharge a non-compliant uncoated rivet or a non-compliant temporary fastener.

15. The multi-task device according to claim 12, wherein said coating station comprises a feeler able to determine a length of a rivet integral with the rivet support module being placed at said coating station.

16. The multi-task device according to claim 15, wherein:

said means for discharging a rivet or a temporary fastener comprise suction discharge means;

the multi-task device comprises a pusher element to initiate the means for discharging; and said pusher element is said feeler.

17. The multi-task device according to claim 1, comprising:

at least one rivet support module and one temporary fastener support module, a work station, a single spindle which is translationally and/or rotatably driven along a single axis, and means for feeding each of said rivet support and temporary fastener modules individually to said work station, said single spindle being cooperable with at least one of the rivet support or temporary fastener modules placed at said work station to allow setting of a rivet or temporary fastener.

18. The multi-task device according to claim 17, comprising a coating station for applying sealant to said rivet, wherein the means for discharging comprise suction discharge means, and wherein said coating station, said temporary fastener loading station and said non-compliant rivet or temporary fastener suction discharge means are situated at a same station.

19. The multi-task device according to claim 17, wherein said means for discharging comprises gravity discharge means and wherein said rivet loading station and said gravity discharge means are situated at a same station.

20. The multi-task device according to claim 1 comprising:

a frame;

means for attaching said frame to motor handling means able to move said device at least partially in space with respect to a structure to be worked on;

means for positioning and/or securing said device to said structure to be worked on.

21. A method comprising:

performing a task by using a multi-task device multi-task device comprising at least:

a rivet support module able to contain a rivet and/or a temporary fastener support module able to contain a temporary fastener;

means for introducing a rivet or temporary fastener into said modules at at least one loading station;

means for moving said at least one module to a work station for setting a rivet or temporary fastener in a hole provided in a structure to be worked on;

means for checking compliance of said rivet incorporated by said rivet support module or temporary fastener incorporated by said temporary fastener support module depending on at least one predetermined compliance criterion; and means for discharging to a disposal zone a rivet or temporary fastener identified as non-compliant by said means for checking;

checking compliance of said rivet or said temporary fastener with the means for checking, depending on at least one predetermined compliance criterion and discharging with the means for discharging, to a disposal zone, a rivet or a temporary fastener identified as non-compliant by said means for checking.

* * * * *